(12) United States Patent
Mishra et al.

(10) Patent No.: US 7,076,785 B2
(45) Date of Patent: Jul. 11, 2006

(54) LAZY LOADING WITH CODE CONVERSION

(75) Inventors: Debi Mishra, Redmond, WA (US);
Sushil Baid, Kolkata (IN); Ramesha Chandrasekhar, Hyderabad (IN);
Nikhil Jain, New Delhi (IN)

(73) Assignee: Microsoft Corporation, Redmond, WA (US)

( * ) Notice: Subject to any disclaimer, the term of this patent is extended or adjusted under 35 U.S.C. 154(b) by 599 days.

(21) Appl. No.: 09/931,650

(22) Filed: Aug. 15, 2001

(65) Prior Publication Data

US 2003/0051073 A1 Mar. 13, 2003

(51) Int. Cl.
*G06F 9/00* (2006.01)

(52) U.S. Cl. .................................. 719/316; 719/331
(58) Field of Classification Search ............... 719/316, 719/331
See application file for complete search history.

(56) References Cited

U.S. PATENT DOCUMENTS

| 5,339,428 | A | 8/1994 | Burmeister et al. |
| 5,845,119 | A | 12/1998 | Kozuka et al. |
| 5,937,189 | A | 8/1999 | Branson et al. |
| 6,002,874 | A | 12/1999 | Bahrs et al. |
| 6,023,578 | A | 2/2000 | Birsan et al. |
| 6,066,181 | A * | 5/2000 | DeMaster ............... 717/148 |
| 6,295,641 | B1 | 9/2001 | Beadle et al. |
| 6,298,476 | B1 | 10/2001 | Misheski et al. |
| 6,446,133 | B1 | 9/2002 | Tan et al. |
| 6,453,356 | B1 | 9/2002 | Sheard et al. |
| 6,467,079 | B1 * | 10/2002 | Ettritch et al. ............. 717/108 |
| 6,513,152 | B1 | 1/2003 | Branson et al. |
| 6,553,405 | B1 * | 4/2003 | Desrochers ............. 709/203 |
| 6,611,817 | B1 | 8/2003 | Dorrance et al. |
| 6,622,165 | B1 | 9/2003 | Phiyaw |
| 6,718,364 | B1 * | 4/2004 | Connelly et al. ............ 709/203 |
| 6,721,942 | B1 | 4/2004 | Sievert |
| 6,738,968 | B1 | 5/2004 | Bosworth et al. |
| 6,754,885 | B1 | 6/2004 | Dardinski et al. |
| 6,754,886 | B1 | 6/2004 | Merk et al. |
| 6,760,913 | B1 | 7/2004 | Bailey et al. |
| 6,813,770 | B1 * | 11/2004 | Allavarpu et al. .......... 719/316 |
| 2002/0073236 | A1 * | 6/2002 | Helgeson et al. ........... 709/246 |
| 2003/0172368 | A1 | 9/2003 | Alumbaugh et al. |
| 2003/0192039 | A1 | 10/2003 | McConnel |
| 2005/0183072 | A1 | 8/2005 | Horning et al. |

OTHER PUBLICATIONS

Bjarne Stroustrub; "The C Programming Language Third Edition" Jul. 7, 1997 pp. 130-131, 384-386 496-497, 847 850-851.
Daniel Wu et al.; "StratOSphere: Mobile Processing of Distributed Objects in Java" ACM 1998 pp. 121-132.

(Continued)

*Primary Examiner*—William Thomson
*Assistant Examiner*—Andy Ho
(74) *Attorney, Agent, or Firm*—Lee & Hayes PLLC (57) ABSTRACT

Exemplary devices and/or methods optionally compile a programming language code associated with one framework to a code associated with another framework; and/or convert a code associated with one framework to a code associated with another framework. The aforementioned devices and/or methods optionally include, but are not limited to, features for supporting framework differences in object hierarchy, exceptions, type characteristics, reflection transparency, and/or scoping, and features for supporting differences in class loading.

18 Claims, 4 Drawing Sheets

OTHER PUBLICATIONS

Robert Stroud; "Transparency and Reflections Distributed Systems" ACM Apr. 1992 pp. 99-103.

Richard Hayton et al.; "FlexiNet—A Flexible Component Oriented Middleware System" ACM Sep. 1998 pp. 17-24.

Tommy Thorn; "Programming Languages for Mobile Code" ACM Computing Surveys vol. 29 No. 3 Sep. 1997 pp. 213-239.

Alois Ferscha et al; "JAVA Based Conservative Distributed Simulation" ACM Dec. 1997 pp. 381-388.

Wen Li et al.; "Collaboration Transparency in the DISCIPLE Framework" ACM Jan. 1999 pp. 326-336.

Begole et al.; "Flexible Collaboration Transparency: Supporting Worker Independence in Replicated Application—Sharing Systems" VPI ACM Jun. 1999 pp. 95-132.

* cited by examiner

LAZY LOADING WITH CODE CONVERSION

RELATED APPLICATIONS

This application is copending with application Ser. No. 09/931,649, entitled "Semantics Mapping Between Different Object Hierarchies", filed concurrently herewith, by Mishra et al. (MS1-929US) and is incorporated herein by reference.

TECHNICAL FIELD

The subject matter relates generally to methods and/or devices for enhancing portability of programming language codes and processed codes, in particular, through methods and/or devices related to loading of code during runtime.

BACKGROUND

An object-oriented programming language (OOPL) typically defines not only the data type of a data structure, but also the types of functions that can be applied to the data structure. In essence, the data structure becomes an object that includes both data and functions. During execution of an OOPL program, access to an object's functionality occurs by calling its methods and accessing its properties, events, and/or fields.

In an OOPL environment, objects are often divided into classes wherein objects that are an instance of the same class share some common property or properties (e.g., methods and/or instance variables). Relationships between classes form a class hierarchy, also referred to herein as an object hierarchy. Through this hierarchy, objects can inherit characteristics from other classes.

In object-oriented programming, the terms "Virtual Machine" (VM) and "Runtime Engine" (RE) have recently become associated with software that executes code on a processor or a hardware platform. In the description presented herein, the term "RE" includes VM. A RE often forms part of a larger system or framework that allows a programmer to develop an application for a variety of users in a platform independent manner. For a programmer, the application development process usually involves selecting a framework, coding in an OOPL associated with that framework, and compiling the code using framework capabilities. The resulting platform-independent, compiled code is then made available to users, usually as an executable file and typically in a binary format. Upon receipt of an executable file, a user can execute the application on a RE associated with the selected framework.

Traditional frameworks, such as the JAVA™ language framework (Sun Microsystems, Inc., Palo Alto, Calif.), were developed initially for use with a single OOPL (i.e., monolithic at the programming language level); however, a recently developed framework, .NET™ framework (Microsoft Corporation, Redmond, Wash.), allows programmers to code in a variety of OOPLs. This multi-OOPL framework is centered around a single compiled "intermediate" language having a virtual object system (VOS). As a result, the object hierarchy and the nature of the compiled code differ between the JAVA™ language framework and the .NET™ framework.

For the discussion presented herein, the term "bytecode" is generally associated with a first framework and the term "intermediate language code" or "IL code" is associated with a second framework, typically capable of compiling a variety of programming languages. In a typical framework, the framework RE compiles code to platform-specific or "native" machine. This second compilation produces an executable native machine code. Throughout the following description, a distinction is drawn between the first compilation process (which compiles a programming language code to bytecode or an intermediate language code) and the second compilation process (which compiles, for example, a bytecode or an intermediate language code to native machine code/instructions). In general, a "compiled code" (or "compiled codes") refers to the result of the first compilation process.

To enhance portability of programming languages and compiled codes, there is a need for methods and/or devices that can perform the following acts: (i) compile a programming language code associated with a first framework (e.g., a bytecode framework) to a compiled code associated with a second framework (e.g., an IL code framework); and (ii) convert a compiled code associated with a first framework (e.g., a bytecode framework) to a compiled code associated with a second framework (e.g., an IL code framework). Such methods and/or devices should account for differences in class loading and perform without substantially compromising the original programmer's intent.

SUMMARY

Exemplary devices and/or methods optionally compile a programming language code associated with one framework to a code associated with another framework; and/or convert a code associated with one framework to a code associated with another framework. The aforementioned devices and/or methods optionally include, but are not limited to, features for supporting framework differences in object hierarchy, exceptions, type characteristics, reflection transparency, and/or scoping, and features for supporting differences in class loading.

An exemplary method receives an initial code associated with a first framework, the initial code including a reference to a referenced class; converts the initial code to a converted code capable of execution on a second framework; executes the converted code on the second framework; detects a need for the referenced class during execution of the converted code on the second framework; and loads the referenced class into memory assessable by the second framework.

Additional features and advantages of the invention will be made apparent from the following detailed description of illustrative embodiments, which proceeds with reference to the accompanying figures.

BRIEF DESCRIPTION OF THE DRAWINGS

A more complete understanding of the various methods and arrangements described herein, and equivalents thereof, may be had by reference to the following detailed description when taken in conjunction with the accompanying drawings wherein.

DETAILED DESCRIPTION

Turning to the drawings, wherein like reference numerals refer to like elements, various methods and converters are illustrated as being implemented in a suitable computing environment. Although not required, the methods and converters will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the methods and converters may be practiced with other computer system configurations, including hand-held devices, multi-processor systems, microprocessor based or programmable consumer electronics, network PCs, minicomputers, mainframe computers, and the like. The methods and converters may also be practiced in distributed computing environments where tasks are performed by remote processing devices that are linked through a communications network. In a distributed computing environment, program modules may be located in both local and remote memory storage devices.

Figure 1:
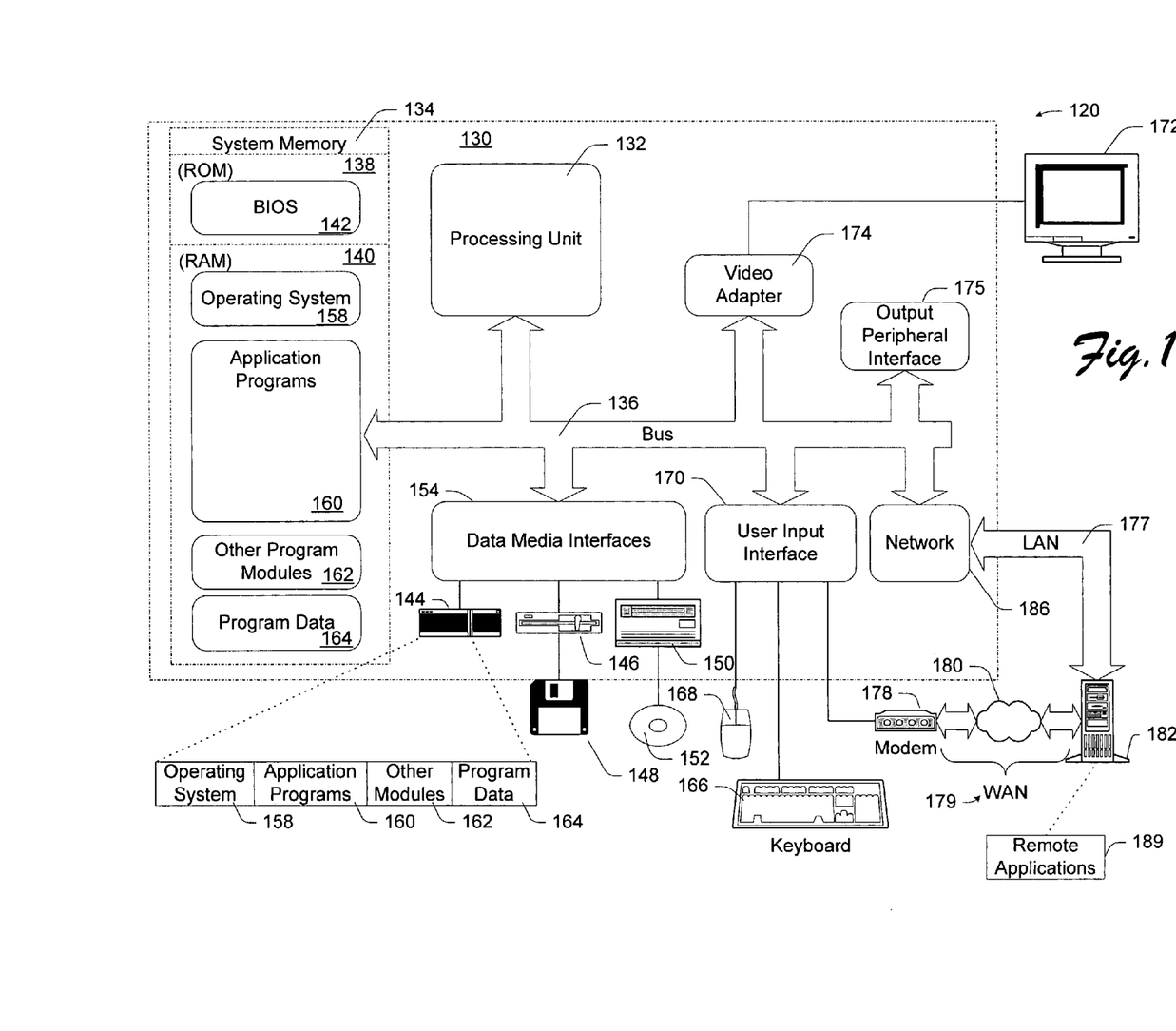
FIG. 1 is a block diagram generally illustrating an exemplary computer system on which the exemplary methods and exemplary systems described herein may be implemented.

FIG. 1 illustrates an example of a suitable computing environment 120 on which the subsequently described methods and converter arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Converters and Lazy Loading

To enhance portability of programming languages and compiled codes, methods and/or converters are presented herein to perform the following acts: (i) compile a programming language code associated with a first framework (e.g., a bytecode framework) to a compiled code associated with a second framework (e.g., an IL code framework); and/or (ii) convert a compiled code associated with a first framework (e.g., a bytecode framework) to a compiled code associated with a second framework (e.g., an IL code framework). The exemplary methods and/or converters operate in conjunction with loaders, such as, but not limited to, class loaders. An exemplary method, described herein, receives an initial code associated with a first framework, the initial code including a reference to a referenced class; converts the initial code to a converted code capable of execution on a second framework; executes the converted code on the second framework; detects a need for the referenced class during execution of the converted code on the second framework; and loads the referenced class into memory assessable by the second framework.

Figure 2:
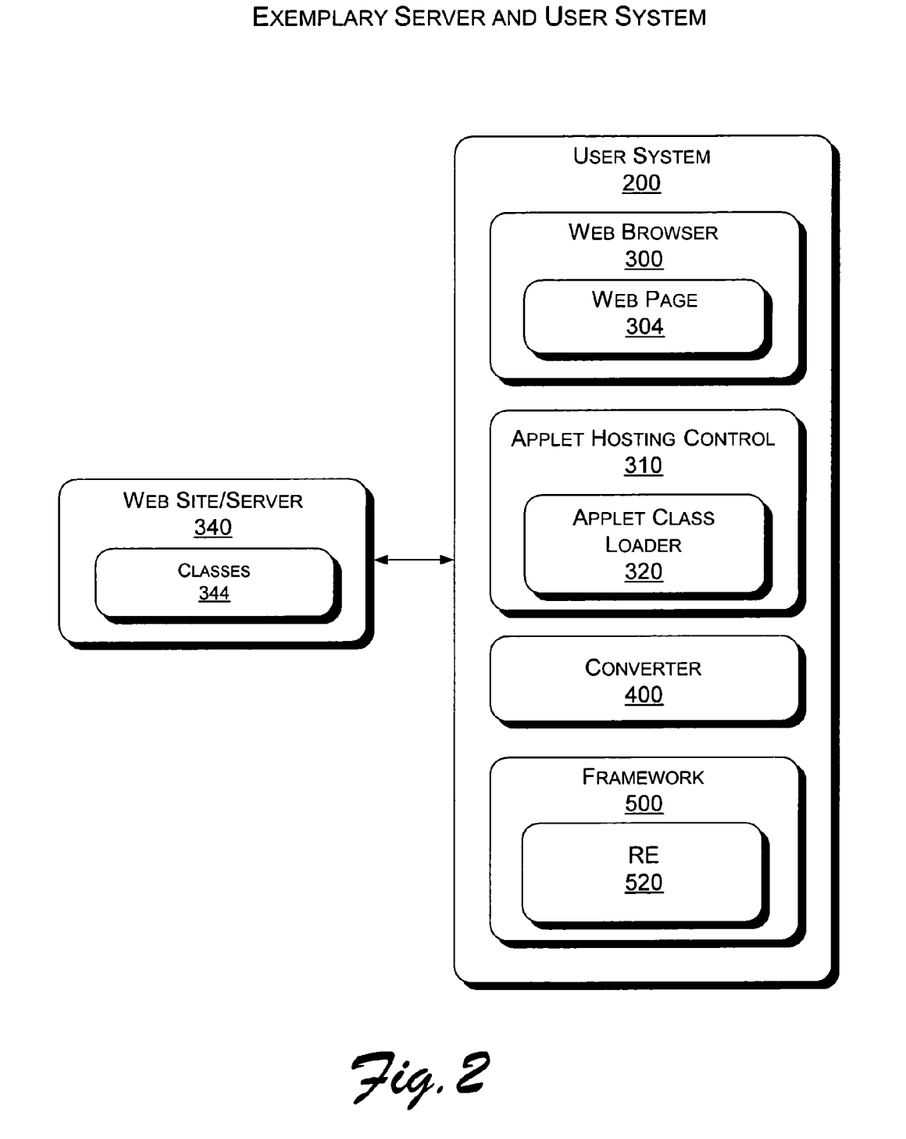
FIG. 2 is a block diagram illustrating a Web site/server and an exemplary user system capable of receiving, converting and executing code from the Web site/server.

FIG. 2 shows a block diagram of an exemplary user system 200 and an exemplary Web site and/or server 340. The user system 200 includes various components of the exemplary computer 120 and peripheral system shown in FIG. 1. The user system 200 and the Web site/server 340 are connected electronically, for example, via a network such as a LAN, a WAN, etc. As shown in FIG. 2, the Web site/server 340 includes classes 344 while the user system 200 includes a Web browser 300, an applet hosting control 310, a converter 400 and a framework 500, such as the .NET™ framework. The converter 400 of the user system 200 can convert a bytecode to an IL code, such as, a JAVA™ language framework bytecode to a .NET™ framework IL code. Alternatively, the converter 400 can compile a programming language code to a compiled code, such as, a JAVA™ language framework programming language code to a .NET™ framework IL code. The user system 200 has the ability to receive bytecode (or programming language code), convert the bytecode (or programming language code) to IL code, and execute the IL code on a framework different from the bytecode's (or programming language code's) associated framework.

Referring to FIG. 2, in general, the Web site/server 340 comprises a Web page server application for hosting a Web page (e.g., Web page 304) on a Web browser (e.g., Web browser 300). Such an application is capable of transmitting other applications in bytecode and/or IL code to a Web browser.

In the JAVA™ language framework, an application in bytecode, or a bytecode application, is typically referred to as an "applet". An applet generally comprises a small, self-contained computer program that performs a task or tasks as part of, or under the control of, a larger software application. For example, most modern World Wide Web browsers are capable of making use of applets written in a JAVA™ programming language to perform tasks such as displaying animations, operating spreadsheets and/or databases, etc. As described herein, the term "applet" is not limited to computer programs written in a JAVA™ programming language and/or compiled to JAVA™ language bytecode.

When a Web browser encounters an "applet" tag in a Web page, an applet class loader is normally invoked. A JAVA™ language framework associated applet class loader is typically a JAVA™ language class that contains code for fetching an applet's executable code (e.g., bytecode) and classes referenced by the executable code. In the JAVA™ language framework, classes are defined in a machine-independent, binary representation known as the class file format. A class usually comprises a small unit of a JAVA™ language framework software component. In addition, an individual class representation is called a class file even though it need not be stored in an actual file. For example, class files can be stored as records or commands in a database. A class file can contain bytecode as well as symbolic references to fields, methods, and names of other classes.

A typical JAVA™ language framework bytecode includes classes that may be required for execution of an applet. Execution of bytecode normally involves identifying a reference to a class and checking to see if that class has already been loaded into memory. The class referenced, is referred to herein as a referenced class. If the referenced class has not been loaded, then the loader attempts to load the referenced class, usually first from a local disk and thereafter from a Web site/server. Thus, in the JAVA™ language framework, classes are loaded on demand or "just-in-time" during bytecode execution. This form of class loading is referred to herein as "lazy loading".

Referring again to FIG. 2, the applet hosting control 310 includes an applet class loader 320 that can fetch an applet's bytecode and identify and/or fetch referenced classes. In the exemplary user system 200 shown in FIG. 2, the applet class loader 320 can fetch referenced classes from a local source and/or a remote source such as the Web site/server 340, for example, from the classes 344 on the Web site/server 340. While the applet hosting control 310 and the applet class loader 320 optionally comprise JAVA™ language framework components, this is not a requirement. In particular, a JAVA™ language RE is not required because the user system 200 includes a framework RE 520 such as the .NET™ framework RE, which optionally has its own associated applet class loader. Alternatively, an applet hosting control 310, having an applet class loader 320, runs on the user system 200, for example, in conjunction with Web browser software and/or as a separate application that runs on an operating system of the user system 200.

Figure 3:
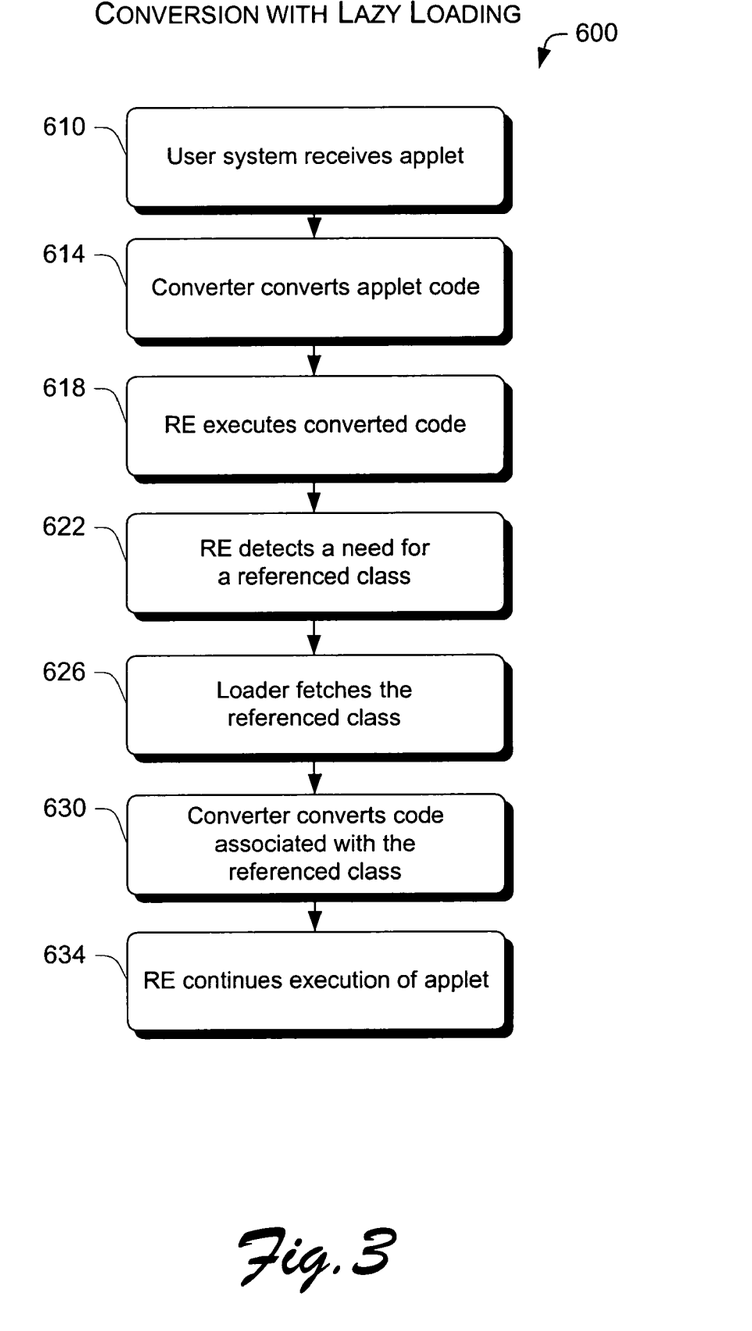
FIG. 3 is a block diagram illustrating an exemplary method for receiving, converting and executing code.

Overall, the exemplary user system 200, shown in FIG. 2, can receive code associated with a first framework, convert it, and execute it on a second framework 500. Furthermore, the applet hosting control 310 allows for lazy loading of code associated with the first framework during execution of converted code on the second framework. FIG. 3 shows a block diagram of an exemplary method 600 for use with the exemplary user system 200 shown in FIG. 2 and optionally other user systems. While the following description of FIG. 3 cross-references FIG. 2, again, it is understood that the exemplary method 600 may be practiced on other user systems.

Referring to FIG. 3, in a receiving block 610, a user system 200 receives an applet associated with a first framework. Next, in a conversion block 614, a converter 400 converts code associated with the applet to a converted code, capable of execution on a second framework 500. In an execution block 618, a RE 520 associated with the second framework 500 executes the converted code. At some point in time during execution, in a detection block 622, the RE 520 detects a need for a referenced class, i.e., a class referenced by the applet and/or converted code. Subsequently, in a loading block 626, a loader 320 fetches (i.e., locates and/or loads) the referenced class. Thereafter, in another conversion block 630, the converter 400 converts code associated with the referenced class to code capable of execution on the framework 500. Next, an execution block 634 resumes execution of the applet's converted code and/or referenced class's converted code on the RE 520 (generally referred to herein as applet execution).

The exemplary user system 200, shown in FIG. 2, optionally includes an application domain and a dynamic assembly. In such a system, the framework 500 operates in conjunction with the applet hosting control 310 and the converter 400 to allow for code associated with a first framework to execute on a second framework, e.g., framework 500. In particular, the converter 400 (and/or optionally the framework 500) provides for the creation of an application domain that maintains a dynamic assembly of classes or types for code referenced and/or converted by the converter 400.

An application domain is an isolated environment where applications execute. In an exemplary framework (e.g., framework 500), an application domain class provides methods for performing the following tasks: enumerating assemblies in a domain; defining dynamic assemblies in a domain; specifying assembly loading and domain termination events; loading assemblies and types into the domain; and terminating the domain. In general, an RE (e.g., RE 520) manages all memory in an application domain.

Figure 4:
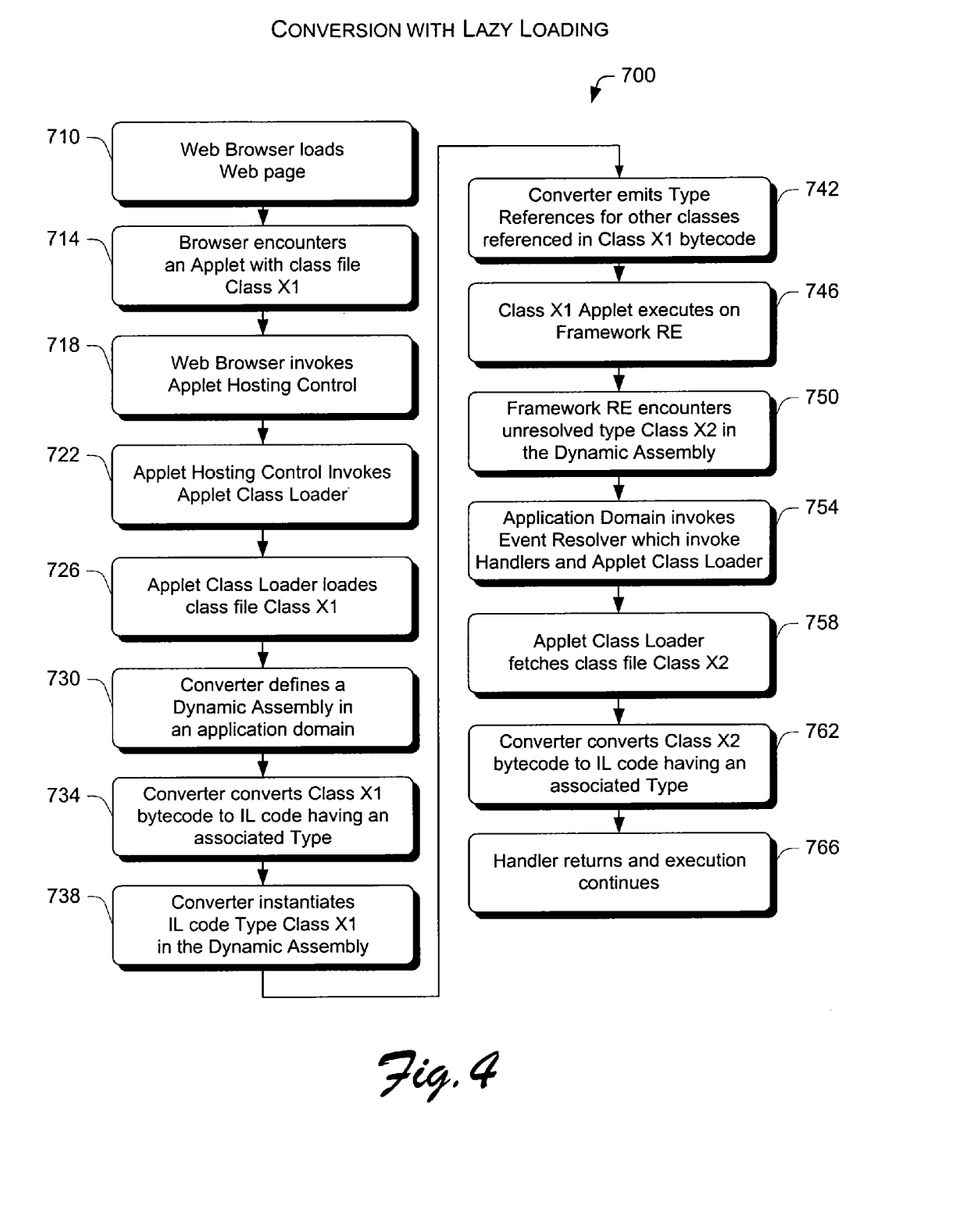
FIG. 4 is a block diagram illustrating an exemplary method for receiving, converting and executing code.

FIG. 4 illustrates a block diagram of another exemplary method 700. While the following description of FIG. 4 cross-references FIG. 2, again, it is understood that the exemplary method 700 may be practiced on other user systems. Referring to FIG. 4, in a loading block 710, the Web browser 300 loads a Web page 304 from a Web site/server 340. Upon loading the Web page 304, the Web browser 300 checks for applets in a check block 714 wherein the Web browser 300 encounters an applet with a class file Class X1.

Class file Class X1 contains the following exemplary code:

```
public ClassX1 extends Applet
{
public void MyMethod1( )
{
...
new ClassX2( ).bar( );
...
}
public void MyMethod2( )
```

-continued

```
{
...
ClassX3 x = new ClassX3( );
...
}
}
```

In response to encountering the applet, the Web browser 300, through an invocation block 718, invokes an applet hosting control 310. In turn, the applet hosting control 310, through another invocation block 722, invokes an applet class loader 320. Subsequently, in a load block 726, the applet class loader 320 loads the class file for ClassX1. In general, the applet class loader 320 loads class files from a remote site or server, such as Web site/server 340, via HTTP. In FIG. 2, Web site/server 340 includes class files 344, e.g., designated X1, X2, X3, . . . . The class files include code associated with a particular framework, for example, bytecode associated with the JAVA™ language framework.

Once the applet class loader 320 has loaded ClassX1 bytecode, e.g., bytecode 324, a converter 400 in a conversion block 730 converts the bytecode 324 to IL code having an associated type. Thereafter, the converter 400 (and/or optionally the framework 500), through a definition block 734, defines a dynamic assembly in an application domain. In the .NET™ framework, an assembly is a collection of types and resources that are built to work together and form a logical unit of functionality. The .NET™ framework supports static and dynamic assemblies. A .NET™ framework typically creates a dynamic assembly using reflection emit APIs; use of APIs for dynamic assemblies and/or conversion is described in more detail in a separate section below. To the .NET™ framework's RE, a type does not exist outside the context of an assembly.

Once a dynamic assembly has been defined, the converter 400 (and/or optionally the framework 500), in an instantiation block 738, instantiates the type for ClassX1 in the dynamic assembly. In some systems, ClassX1 may now be referred to as being "baked" because it is ready for execution by the framework's RE. However, referring to the aforementioned code for class file ClassX1, this code includes references to ClassX2 and ClassX3. Since these classes have not been instantiated as types in the dynamic assembly, they are not ready for execution by the framework's RE. In some systems, ClassX2 and ClassX3 may be referred to as being "unbaked".

Referring again to the exemplary user system 200 shown in FIG. 2 and the exemplary method 700 shown in FIG. 4, the converter 400 (and/or optionally the framework 500), through a reference block 742, emits type references for classes ClassX2 and ClassX3. Thus, in addition to the type for ClassX1, the dynamic assembly now contains type references for class files that may be needed for execution of the ClassX1 applet.

In an execution block 746, the RE 520 executes the ClassX1 applet. The execution continues until the RE 520 encounters an unresolved type. For example, in an execution block 750, the RE 520 encounters an unresolved reference for type ClassX2 in the dynamic assembly. In response to this encounter, the application domain, in an invocation block 754, invokes an event resolver, which invokes the applet class loader 320 and optionally a handler.

In a load block 758, the applet class loader 320 searches for the class file for ClassX2 and fetches the file, for example, from the Web site/server 340. The conversion process, as already described, uses the converter 400 to convert, through a conversion block 762, the ClassX2 bytecode to IL code. Again, type references are created if ClassX2 references additional classes. After the conversion, in a return and continuation block 766, the handler returns and/or gives notification that the conversion for ClassX2 has taken place and the converter 400 (and/or optionally the framework 500), instantiates type ClassX2 in the dynamic assembly, and the framework 500 continues execution of the ClassX1 applet.

As described, the exemplary method 700 shown in FIG. 4 relies on lazy loading. In particular, ClassX2 was not loaded or converted until an impending need for ClassX2 was shown to exist, or detected, during execution of the ClassX1 applet. Lazy loading can reduce memory usage because certain classes referenced by an applet may never be called during execution of the applet. To load all classes, regardless of whether they are called or not, would introduce an up-front demand requiring both time for loading and conversion and memory for storing loaded and converted code.

While FIG. 4 shows an exemplary method 700 using lazy loading, the exemplary user system 200 shown in FIG. 2 has the ability to perform up-front loading with conversion on a lazy basis, i.e., "eager" loading and lazy conversion. In addition, this exemplary system 200 may also perform eager loading and conversion with lazy instantiation of types and/or type references into the dynamic assembly.

The exemplary user system 200 and the exemplary method 700 of FIGS. 2 and 4, respectively, allow code associated with a first framework to execute on a second framework. When the first framework relies on lazy loading, the second framework should also rely on lazy loading to mimic operation of the first framework and to retain the programmer's original intent.

In another exemplary user system, a Web browser is optional. In such a system, a user does not interact with an applet via a browser. For example, the user system may comprise a server or other computer-enabled device wherein the applet executes automatically without any direct human user input. For this exemplary system, as for the others mentioned herein, a user refers to a human user and/or a device user. The same definition of user also applies to exemplary methods described herein.

Use of APIs for Conversion and/or Lazy Loading

As mentioned above, the exemplary system 200 and/or exemplary method 700 of FIGS. 2 and 4, respectively, optionally use APIs for dynamic assemblies and/or conversion. In particular, as described above, during execution of an applet, an RE may encounter a type or a class that is not instantiated or referenced in the dynamic assembly. An event resolver and/or a handler act as hooks to fetch, convert, reference and/or instantiate the missing type or class.

In the case that a RE encounters a class that, for the time being, is only referenced by an applet, then the framework invokes an API to generate an incomplete type definition for the referenced class. The incomplete type definition, or dummy class, only refers to a method or a property within the referenced class. An API is used to emit a reference type corresponding to the incomplete type. Again, in some systems, such a class or type is referred to as being "unbaked".

In the .NET™ framework, the hook optionally includes an event handler for an OnResolveType event. In an exemplary method, during loading of a first applet class, an event handler is registered using an AddOnTypeResolve method on an assembly. If and when the code containing the reference is actually executed, the OnResolveType event is raised and the AddOnTypeResolve handler code recognizes the event as a fault corresponding to a missing class or type. The handler then invokes an applet class loader, which attempts to fetch the missing class, and a converter, which converts the bytecode, metadata, class implementation, methods, inheritance properties, fields etc. into IL code and/or IL metadata. This conversion is optionally performed using reflection emit APIs, for example, the APIs in the .NET™ framework's System.Reflection.Emit namespace. For a given bytecode class, such APIs can create appropriate constructs of each method, field, interface in IL code, which can be emitted into the dynamic assembly.

A .NET™ framework optionally includes the following APIs: ContructorBuilder class, which defines and represents a constructor of a dynamic class and, in conjunction with TypeBuilder class, it can create classes at run time; FieldBuilder class, which defines and represents a field; MethodBuilder class, which defines and represents a method (or constructor) on a dynamic class and, in conjunction with TypeBuilder class, it can create classes at runtime; PackingSize Enumeration, which specifies the packing size of a type; TypeAttributes Enumeration, which specifies type attributes; FieldAttributes Enumeration, which specifies flags that describe the attributes of a field; MethodAttributes Enumeration, which specifies flags for method attributes; and TypeBuilder class, which defines and creates new instances of classes during runtime. The TypeBuilder class is the root class used to control the creation of dynamic classes and it provides a set of routines that are used to define classes, add methods and fields, and create the class inside a domain.

According to the exemplary method of FIG. 4, when a reference type (e.g., dummy or unbaked type) is created, various type characteristics are not necessarily specified (e.g., Private, Public, LayoutSequential, Sealed, etc.). Thus, an exemplary system and/or exemplary method includes a means to set and/or change such characteristic once a loader fetches a class file corresponding to the reference type and/or once a converter converts a class file bytecode, corresponding to the reference type, to IL code. A suitable means optionally includes the following methods in TypeBuilder: a method to change the TypeAttributes; and a method to change the PackingSize.

In addition, for dummy methods inside a reference type (e.g., dummy or unbaked), various method characteristics are not necessarily specified (e.g., Private, Public, Static, Final, PInvoke, etc.). Thus, an exemplary system and/or an exemplary method include a means to set and/or change such characteristic. A suitable means optionally includes the following methods in MethodBuilder: a method to change the MethodAttributes; and a method to change an ordinary method to a Platform Invoke (PInvoke) method. Further support includes a method to set and/or change TypeAttributes of a ContructorBuilder and/or FieldAttributes of a FieldBuilder.

While various exemplary converters and methods described herein apply to converting code from a JAVA™ language framework to a .NET™ framework, conversions from a .NET™ framework to a JAVA™ language framework are also within the scope of exemplary systems and exemplary methods presented herein as well as conversions to, from and/or between other frameworks known in the art.

Thus, although some exemplary methods and exemplary systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

What is claimed is:

1. A computer-implemented method comprising:
receiving an initial code associated with a bytecode framework, the initial code including a reference to a referenced class of the bytecode framework;
convening the initial code to a converted code capable of execution on an intermediate language code framework;
executing the converted code on the intermediate language code framework;
detecting a need for the referenced class during execution of the converted code on the intermediate language code framework; and
executing code for the referenced class on the intermediate language code framework, wherein the code for the reference class comprises code associated with a bytecode framework and further comprising converting the code for the referenced class to a converted reference class code capable of execution on the intermediate language code framework.

2. The method of claim 1 wherein the initial code comprises an applet.

3. The method of claim 1 further comprising creating a reference type for the referenced class.

4. The method of claim 5 wherein the executing executes the converted referenced class code on the intermediate language code framework.

5. A computer-readable medium storing computer-executable instructions to receive an initial code associated with a bytecode framework, the initial code including a reference to a referenced class of the bytecode framework; to convert the initial code to a converted code capable of execution on an intermediate language code framework; to execute the converted code on the intermediate language code framework; to detect a need for the referenced class during execution of the converted code on the intermediate language code framework; to initiate loading of the referenced class code into memory associated with an intermediate language code framework; to initiate conversion of the reference class code to a convened reference class code capable of execution on the intermediate language code framework and to initiate execution of the convened reference class code on the intermediate language code framework.

6. A computer-implemented method comprising:
receiving an initial code associated with a bytecode framework, the initial code including a reference to a referenced class, the referenced class comprising referenced class code associated with the bytecode framework;
convening the initial code to a convened code capable of execution on an intermediate language code framework;
executing the converted code on the intermediate language code framework;
detecting a need for the referenced class during execution of the converted code on the intermediate language code framework;
loading code for the referenced class into memory accessible by the intermediate language code framework;
converting the code for the referenced class code a convened code for the reference class capable of execution on the intermediate language code framework; and
executing the convened code for the reference class on the intermediate language code framework.

7. The method of claim 6 wherein the initial code comprises an applet.

8. The method of claim 7 further comprising creating a reference type for the referenced class.

9. A user computer system comprising:
an applet class loader;
a convener; and
an intermediate language code framework, wherein the converter converts code associated with a bytecode framework to a convened code capable of execution on the intermediate language code framework wherein upon detection of a need for a referenced class associated with the bytecode framework, during execution of the converted code on the intermediate language code framework, the applet class loader loads one or more class files comprising the referenced class file code associated with the bytecode framework, wherein the converter converts the class file code to a converted class file code capable of execution on wherein the intermediate language code framework; and the intermediate language code framework executes the converted class file code.

10. The system of claim 9 wherein the intermediate language code framework comprises a runtime engine.

11. The system of claim 9 wherein the intermediate language code framework comprises an application domain.

12. The system of claim 9 wherein the intermediate language code framework comprises a dynamic assembly.

13. A user computer system comprising:
reception means for receiving an initial code associated with a bytecode framework, the initial code including a reference to a referenced class;
conversion means for converting the initial code to a converted code capable of execution on an intermediate language code framework;
execution means for executing the converted code on the intermediate language code framework;
detection means for detecting a need for the referenced class during execution of the converted code on the intermediate language code framework; and
conversion means for converting r code for the referenced class to converted code for the referenced class en able of execution on the intermediate language code framework wherein the execution means corn rises means for executing the converted code for the referenced class.

14. The user system of claim 13 further comprising an applet class loader.

15. The user system of claim 13 wherein the execution means includes a runtime engine.

16. The user system of claim 13 wherein the reception means includes a browser.

17. The user system of claim 13 wherein the initial code includes an applet.

18. A computer-implemented method comprising:
receiving an applet associated with a bytecode framework, the applet including applet code and a reference to a referenced class;
convening the applet code to an intermediate language code capable of execution on an intermediate language code framework;
executing the intermediate language code on the intermediate language code framework;
detecting a need for the referenced class during execution of the intermediate language code on the intermediate language code framework; and loading the referenced class into memory accessible by the intermediate language code framework;
converting code for the referenced class into converted code for the referenced class; and
executing the converted code for the referenced class on the intermediate language code framework.

* * * * *

UNITED STATES PATENT AND TRADEMARK OFFICE
CERTIFICATE OF CORRECTION

PATENT NO. : 7,076,785 B2
APPLICATION NO. : 09/931650
DATED : July 11, 2006
INVENTOR(S) : Debi Mishra et al.

It is certified that error appears in the above-identified patent and that said Letters Patent is hereby corrected as shown below:

On the face page, in field (56), under "U.S. Patent Documents", in column 2, line 14, after "10/2003" delete "McConnel" and insert -- McConnell --, therefor.

On the face page, in field (56), under "U.S. Patent Documents", in column 2, line 15, after "8/2005" delete "Homing" and insert -- Horning --, therefor.

On the face page, in field (56), under "Other Publications", in column 2, line 1, delete "Stroustrub" and insert -- Stroustrup --, therefor.

On page 2, in field (56), under "Other Publications", in column 1, line 1, after "Reflections" insert -- in --.

On page 2, in field (56), under "Other Publications", in column 2, line 4, delete "336" and insert -- 335 --, therefor.

In column 1, line 6, delete "09/931,649 ," and insert -- 09/931,649, --, therefor.

In column 11, line 10, in Claim 1, delete "convening" and insert -- converting --, therefor.

In column 11, line 29, in Claim 4, delete "claim 5" and insert -- claim 1 --, therefor.

In column 11, line 45, in Claim 5, delete "convened" and insert -- converted --, therefor.

In column 11, line 46, in Claim 5, after "framework" insert -- ; --.

In column 11, line 47, in Claim 5, delete "convened" and insert -- converted --, therefor.

In column 11, line 55, in Claim 6, delete "convening" and insert -- converting --, therefor.

In column 11, line 55, in Claim 6, delete "convened" and insert -- converted --, therefor.

In column 11, line 66, in Claim 6, delete "convened" and insert -- converted --, therefor.

In column 12, line 1, in Claim 6, delete "convened" and insert -- converted --, therefor.

CERTIFICATE OF CORRECTION (continued)
U.S. Pat. No. 7,076,785 B2

In column 12, line 9, in Claim 9, delete "convener" and insert -- converter --, therefor.

In column 12, line 12, in Claim 9, delete "convened" and insert -- converted --, therefor.

In column 12, line 13, in Claim 9, after "framework" insert -- ; --.

In column 12, line 19, in Claim 9, after "framework" delete "," and insert -- ; --, therefor.

In column 12, line 21, in Claim 9, after "execution on" delete "wherein".

In column 12, line 22, in Claim 9, after "and" insert -- wherein --.

In column 12, line 43, in Claim 13, after "converting" delete "r".

In column 12, line 44, in Claim 13, delete "en able" and insert -- capable --, therefor.

In column 12, line 46, in Claim 13, delete "corn rises" and insert -- comprises --, therefor.

In column 12, line 60, in Claim 18, delete "convening" and insert -- converting --, therefor.

Signed and Sealed this

Thirteenth Day of April, 2010

David J. Kappos
*Director of the United States Patent and Trademark Office*